(12) United States Patent
Al-Quraishi

(10) Patent No.: US 7,745,366 B2
(45) Date of Patent: Jun. 29, 2010

(54) MICROWAVE SPENT CATALYST DECOKING METHOD

(75) Inventor: Saleh I. Al-Quraishi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 12/289,793

(22) Filed: Nov. 4, 2008

(65) Prior Publication Data

US 2010/0113253 A1 May 6, 2010

(51) Int. Cl.
*B01J 20/30* (2006.01)
(52) U.S. Cl. .............................. 502/56; 502/40; 502/38
(58) Field of Classification Search .................. 502/40, 502/38, 56
See application file for complete search history.

(56) References Cited

U.S. PATENT DOCUMENTS

| | | | |
|---|---|---|---|
| 4,026,821 A | 5/1977 | Schoofs et al. | |
| 4,144,189 A * | 3/1979 | Kirkbride | 502/5 |
| 4,282,066 A | 8/1981 | Wagener et al. | |
| 4,398,076 A | 8/1983 | Hanson | |
| 4,551,437 A | 11/1985 | Berrebi | |
| 4,605,371 A | 8/1986 | Berrebi | |
| 4,663,507 A * | 5/1987 | Trerice | 219/694 |
| 4,749,470 A | 6/1988 | Herbst et al. | |
| 4,968,403 A | 11/1990 | Herbst et al. | |
| 5,073,349 A | 12/1991 | Herbst et al. | |
| 5,374,413 A | 12/1994 | Kim et al. | |
| 5,382,412 A | 1/1995 | Kim et al. | |
| 6,184,427 B1 | 2/2001 | Klepfer et al. | |
| 6,516,143 B2 * | 2/2003 | Toya et al. | 392/480 |
| 6,596,915 B1 * | 7/2003 | Satyapal et al. | 588/313 |
| 2004/0175547 A1 * | 9/2004 | Blankenbeckler et al. | 428/195.1 |
| 2006/0252630 A1 * | 11/2006 | Fanson et al. | 502/20 |
| 2008/0142511 A1 * | 6/2008 | Ripley | 219/690 |

FOREIGN PATENT DOCUMENTS

| | | |
|---|---|---|
| AU | 3504878 | 10/1979 |
| CA | 1128894 | 8/1982 |
| JP | 8295951 | 11/1996 |
| JP | 11246918 | 9/1999 |

* cited by examiner

*Primary Examiner*—Stuart Hendrickson
*Assistant Examiner*—Michelle Hou
(74) *Attorney, Agent, or Firm*—Richard C. Litman

(57) ABSTRACT

The microwave spent catalyst decoking method is a method for regenerating petrochemical catalysts by removing coke deposited in the catalyst using a 2.45 GHz microwave oven. The spent catalyst is heated in air or pure oxygen in the presence of a susceptor. The susceptor is made of silicon carbide-based composite material that absorbs 2.45 GHz microwave energy fast and efficiently. In one embodiment, the susceptor material is formed into pellets that are preferably four to five millimeters in diameter. The susceptor pellets are mixed with the spent catalyst and loaded into a thermally shielded refractory tube that rotates about its central axis. In a another embodiment, the apparatus is a thermally shielded tower or vertical tube made of refractory material that is transparent to microwave radiation and supports rows of susceptor rods that are aligned horizontally.

7 Claims, 2 Drawing Sheets

MICROWAVE SPENT CATALYST DECOKING METHOD

BACKGROUND OF THE INVENTION

1. Field of the Invention

The present invention relates to the regeneration of spent catalysts, and, more particularly, to a microwave spent catalyst decoking method for regenerating petrochemical catalysts using microwave energy.

2. Description of the Related Art

Certain petroleum refining processes, such as hydrotreating, hydrocracking, catalytic cracking, catalytic reforming and isomerization are carried out at elevated temperatures in the presence of a catalyst, such as silica, alumina, zeolites, etc. In some of these processes coking of the catalyst occurs, which blocks the pores of the catalyst where the catalytic reactions can take place. Coke is deposited onto the catalyst, with the result that over a period of time the catalyst gradually loses its activity. To restore the activity of the catalyst, the catalyst must be periodically regenerated, which is usually accomplished by combustion the coke at elevated temperatures in the presence of an oxygen-containing gas, such as air or oxygen-enriched air.

The catalytic process may be carried out by any one of various procedures. For example, the process may be a fixed bed process, in which case the catalytic reaction and catalyst regeneration are conducted in a single vessel, or it may be one of the moving catalyst processes, such as a transport bed process or a fluidized bed process, in which case the catalytic reaction is carried out in one vessel and catalyst regeneration is carried out in another vessel. A major advantage that moving catalyst processes have over fixed bed processes is that in moving bed processes, the reaction can be carried out continuously, whereas in fixed bed processes, the catalytic reaction must be terminated periodically to regenerate the catalyst.

In moving catalyst systems, the hydrocarbon feed and hot freshly regenerated catalyst, and perhaps steam, are continuously introduced into the reactor. The hot catalyst causes the hydrocarbon feed to react, thereby producing an array of valuable hydrocarbon products that may be of lower molecular weight than the hydrocarbon feed. During the course of the reaction the catalyst becomes fouled with coke deposits and loses its catalytic activity. The hydrocarbon products and fouled catalyst are separated, and each leaves the reactor. The hydrocarbon products are sent to downstream hydrocarbon separation units to recover the various products, and the fouled catalyst is transported to a catalyst regenerator for removal of coke from the catalyst.

The effectiveness of the regenerator in burning coke off the catalyst directly determines the quality of performance of the hydrocarbon reaction (e.g., cracking) step. The regeneration step provides reactivated catalyst and heat for the endothermic hydrocarbon-cracking step. The catalyst is heated during the regeneration step and the hot catalyst is transported to the reactor, where it contacts the hydrocarbon feed and causes the reactions to occur.

The amount of oxygen-containing gas present in the regenerator determines the amount of coke that can be burned off the catalyst. The kinetics and efficiency of the combustion process also determines the steady-state concentrations of coke returned to the reactor on the reactivated catalyst, and the amount of coke on the spent catalyst entering the regenerator. In general, the more efficiently the catalyst is reactivated, the better its hydrocarbon reaction activity and selectivity will be, and the greater its ability to process heavier, poorer quality feedstock will be.

The rate of coke combustion is usually controlled by regulating the amount of oxygen entering the coke combustion zone during catalyst regeneration. Traditionally, catalyst regeneration has been carried out using air as the oxygen-containing gas. The nitrogen in air serves to remove heat from the reaction zone, thereby moderating the combustion. If it is desired to increase the rate of combustion, the follow of air through the regeneration zone is increased. This will have the sometimes undesirable effect of increasing the velocity of gas flowing through the combustion zone, which can cause excessive attrition and loss of the catalyst and excessive wear on equipment. To avoid these effects, some recent improvements have centered on the use of other oxygen-inert gas mixtures, such as oxygen-carbon dioxide mixtures, for catalyst regeneration. Carbon dioxide has a greater heat capacity than nitrogen. Accordingly the same amount of heat transfer can be affected with a lower volume of carbon dioxide than would be required using nitrogen, which means that the feed gas can be richer in oxygen.

However, there is a need for a process that can regenerate petroleum refining catalysts quicker and more efficiently than conventional thermal treatment. Thus, a microwave-spent catalyst decoking method solving the aforementioned problems is desired.

SUMMARY OF THE INVENTION

The microwave spent catalyst decoking method is a method for regenerating petrochemical catalysts by removing coke deposited in the catalyst using a 2.45 GHz microwave oven. The spent catalyst is heated in air or pure oxygen in the presence of a susceptor. The susceptor is made of a silicon carbide (SiC) composite material that absorbs 2.45 GHz microwave energy fast and efficiently.

The SiC susceptor material is formed into pellets that are preferable four to five millimeters in diameter. The susceptor pellets are mixed with the spent catalyst and loaded into a thermally shielded refractory tube that rotates about its central axis. The tube and the thermal shielding are made of materials that are microwave transparent.

Rotation of the refractory tube distributes the microwave energy evenly throughout the catalyst/susceptor mixture. The microwave exposure time, airflow rate, and the power of the microwave are controlled so that the temperature of the catalyst and susceptor remain at an optimum value that provides high quality decoking. At the end of the decoking process, the catalyst is separated from the susceptor material. The activity of the treated catalyst is enhanced and the carbon content is reduced to an undetectable level.

In an alternative embodiment, the regenerator includes a tower made of a refractory material transparent to microwave energy. Rows of horizontally aligned rods made from susceptor material are spaced apart at different heights throughout the tower. The spent catalyst is fed at the top of the tower and is irradiated by microwave energy as the catalyst flows towards the bottom of the regenerator. Coke and other waste is converted by the heat of the rods and by direct microwave energy to gaseous waste that exits through an exhaust port at the top of the tower, while the regenerated catalyst exits the bottom of the tower.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a microwave spent catalyst decoking method for regenerating petrochemical catalysts by removing coke deposited in the catalyst using a 2.45 GHz microwave oven.

Figure 1:
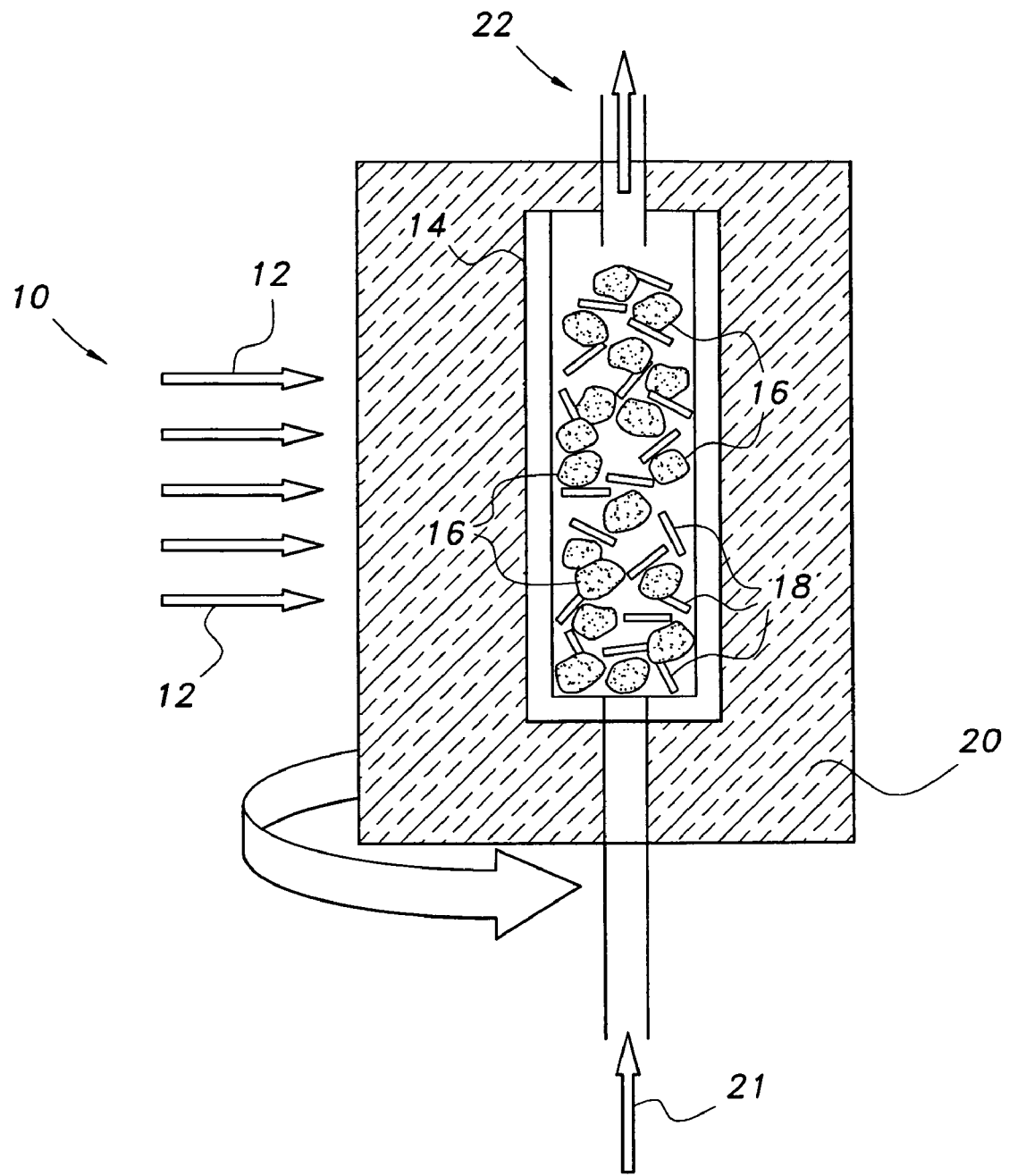
FIG. 1 is a diagrammatic view of a first apparatus for carrying out a microwave spent catalyst decoking method according to the present invention.

FIG. 1 schematically illustrates a first apparatus 10 for carrying out the method. A tube 14 made from refractory material transparent to microwave energy is rotatable about its central axis. The tube 14 is enclosed by a thermal shielding 20 made of fibers transparent to microwave energy, such as a blanket of alumina fibers wrapped around the tube 14 to rotate therewith. The spent catalyst 18 is loaded into the refractory tube 14 and mixed with pellets 16 of silicon carbide-based susceptor material. The pellets 16 are preferably four to five millimeters in diameter.

Microwave radiation 12 is directed through the thermal shielding 20 and refractory tube 14 to irradiate the spent catalyst 18 and susceptor material 16 with microwaves at a frequency of 2.45 GHz, heating the susceptor material 16 to a very high temperature. Air or oxygen 21 is pumped into an end of the refractory tube 14 at a controlled rate, which forces waste gases 22 from the combusted coke out the other end of the refractory tube 14. Rotation of the refractory tube 14 helps to distribute the microwave energy 10 evenly throughout the mixture of the catalyst 18 and susceptor material 16.

The exposure time and power of the microwave energy 12, and the rate of flow of the air or oxygen 21 are controlled to maintain a sufficient temperature that will yield high quality decoking of the catalyst 18. At the end of the process, the catalyst 18 is separated from the susceptor material 16. The activity of the treated catalyst 18 is enhanced, and the carbon content is reduced to an undetectable level.

Figure 2:
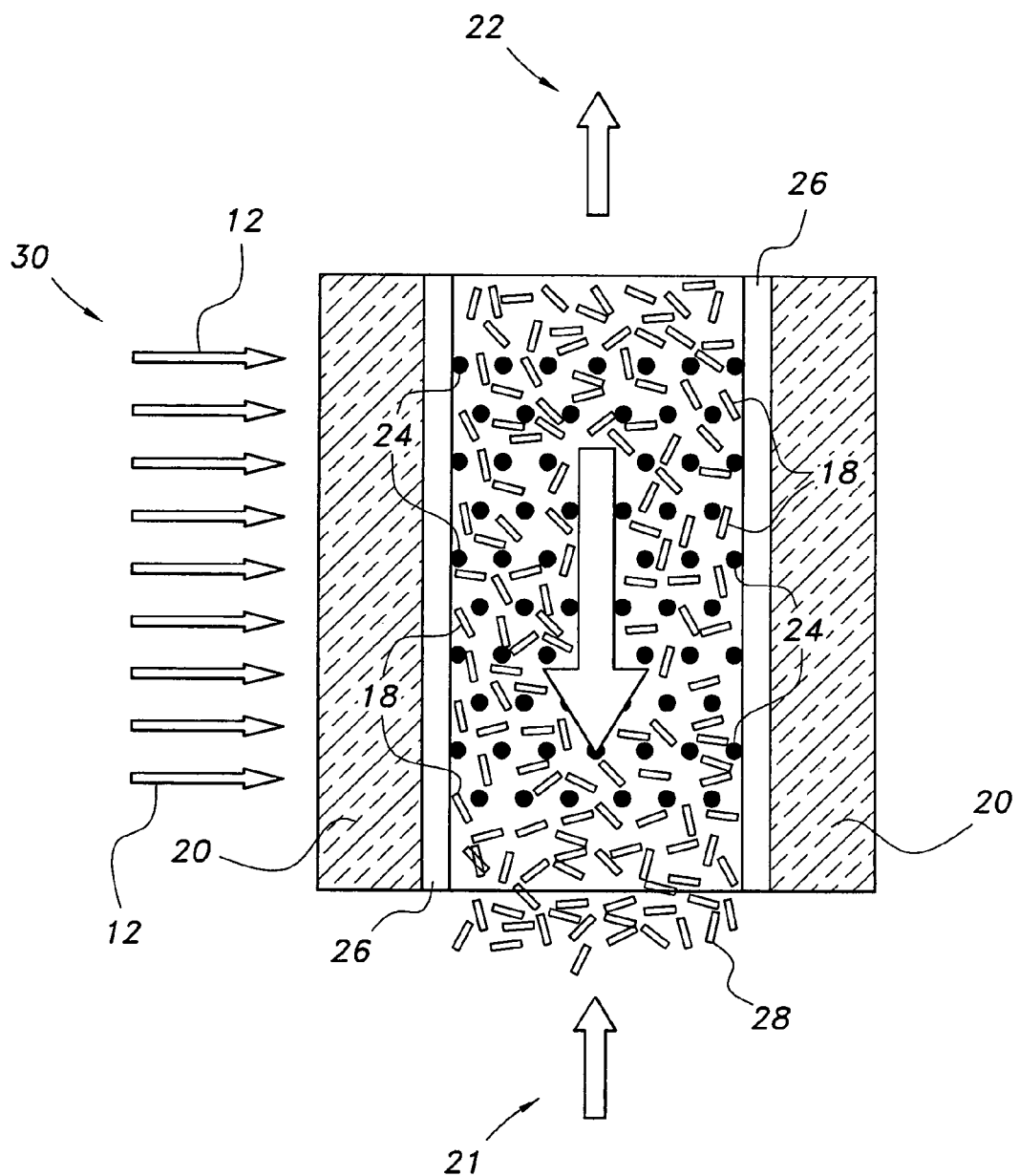
FIG. 2 is a diagrammatic view of a second apparatus for carrying out a microwave spent catalyst decoking method according to the present invention.

FIG. 2 is a diagrammatic representation of an alternative embodiment of an apparatus 30 for decoking spent catalyst. A tower or vertical tube 26 made from a refractory material transparent to microwave energy is encased in a thermal shield 20 made from fibers transparent to microwave energy, such as a blanket of alumina fibers. The refractory tube 26 contains a plurality of rows of horizontally aligned susceptor rods 24 (rods made from or coated with a silicon carbide-based susceptor material) spaced apart at various heights in the tube 26.

The spent catalyst 18 is loaded into the top of the refractory tube 26. The apparatus is irradiated with microwaves 12. The susceptor rods 24 absorb the microwave energy and are heated. The final temperature is determined by the composition of the susceptor rods 24, the power of the microwave radiation 12, and the efficiency of the thermal shielding 20. The spent catalyst 18 is fed into the top of the refractory tube 14 and moves down between the hot horizontal susceptor rods 24, picking up the heat from the rods 24 and simultaneously absorbing the microwave radiation 12 on the way to the bottom of the refractory tube 26.

A flow of air or oxygen 21 forces the waste gases 22 from the combusted coke out of the top of the refractory tube 26. The flow rate of the air or oxygen 21 is predetermined to insure full combustion of the coke. The regenerated catalyst 28 exits from the bottom of the refractory tube 26. The microwave spent catalyst decoking method is further illustrated by the following non-limiting example.

Example 1

Treated and fresh catalysts were evaluated in a fixed bed flow reactor system and compared with a microwave treated sample. Five milliliters of catalyst was loaded into the reactor tube, supported by silicon carbide. The reactor was heated to the desired temperature by a three-zone electrical furnace. Liquid feed was pumped into the reactor at the required flow rate, and hydrogen gas was fed into the system through a mass flow controller. Reaction products exiting the reactor were separated into gas and liquid components in a high-pressure separator. Steady-state operating conditions were achieved after three hours. Liquid and gas samples were collected three hours after steady state was achieved. The liquid was analyzed in a gas chromatograph based PONA analyzer.

The feed used was a hydrotreated straight-run heavy naphtha consisting of five percent normal paraffin's, fifty-six percent isoparaffin, thirty-one percent naphthenes, and eight percent aromatics. The octane number of the liquid was 68. The reaction was carried out at a temperature of 480° C. and a space velocity of 4 $hr^{-1}$. The hydrogen to hydrocarbon ratio was 6.0. The hydrogen pressure was 225 p.s.i.

Several reactions take place simultaneously during catalytic reforming. These are dehydrogenation of naphthenes to aromatics, isomerization of n-paraffin to branched paraffin, and cyclization of isoparaffins to naphthenes. The extent of each reaction is dependant upon the operating conditions and the type of feed used. Under the conditions of this example, the dominant reaction that occurred was the cyclization of isoparaffin to naphthenes.

Table I shows the composition of naphtha feed and the resulting naphtha obtained with fresh and treated catalysts. As Table I shows, the feed naphtha contained fifty-six percent by weight of isoparaffin, which was reduced to fifty percent with fresh catalyst. When the resulting naphtha was compared to the microwave-treated sample, the naphthenes in the microwave-treated sample increased forty-six percent, corresponding to a catalyst activity of twenty-nine percent for fresh catalyst, and an activity measure of forty-eight percent for the microwave-treated sample.

TABLE I

Feed and Product Composition

| Composition Wt. % | Feed | Product with Catalysts | |
| --- | --- | --- | --- |
| | | Fresh | Microwave-Treated |
| N-Paraffin | 5 | 3.1 | 1 |
| I-Paraffin | 56 | 50 | 47 |
| Olefin | 0 | 0 | 0 |
| Naphthenes | 31 | 40 | 46 |
| Aromatics | 8 | 7 | 6 |
| Octane number | 68 | 78 | 79 |

TABLE I-continued

Feed and Product Composition

| Composition Wt. % | Feed | Product with Catalysts | |
|---|---|---|---|
| | | Fresh | Microwave-Treated |
| Δ-Octane | base | 10 | 11 |
| Activity, % | base | 29 | 48 |

Activity: Transformation of I-Paraffins to Naphthenes

The octane number of the liquid obtained with fresh catalyst was 78, ten numbers higher than the feed octane number of 68. The liquid obtained from the microwave-treated sample had an octane number of 79.

It is to be understood that the present invention is not limited to the embodiments described above, but encompasses any and all embodiments within the scope of the following claims.

I claim:

1. A microwave spent petrochemical refining catalyst decoking method, comprising the steps of:
   introducing a spent petrochemical refining catalyst into a refractory tube containing a microwave susceptor, wherein said catalyst has carbonaceous coke deposited thereon, said microwave susceptor comprising pellets of susceptor material;
   mixing the spent petrochemical refining catalyst with the pellets of susceptor material;
   irradiating the refractory tube with microwave energy at an effective temperature and time to decoke and regenerate the catalyst; and
   separating the spent petrochemical refining catalyst from the pellets of susceptor material to recover regenerated catalyst.

2. The microwave spent catalyst decoking method according to claim 1, when said step of irradiating the tube further comprises irradiating the tube with microwaves at a frequency of 2.45 GHz.

3. The microwave spent catalyst decoking method according to claim 1, further comprising the step of pumping a flow of oxygen gas through the spent catalyst and microwave susceptor while irradiating the tube with microwave energy.

4. The microwave spent catalyst decoking method according to claim 1, further comprising the step of pumping a flow of air through the spent catalyst and microwave susceptor while irradiating the tube with microwave energy.

5. The microwave spent catalyst decoking method according to claim 1, further comprising the step of rotating said tube while irradiating the tube with the microwave energy.

6. The microwave spent catalyst decoking method according to claim 1, further comprising the step of wrapping the tube with thermal insulation transparent to microwave energy prior to the step of irradiating the tube with microwave energy.

7. The microwave spent catalyst decoking method according to claim 1, wherein said tube is aligned vertically from top to bottom and said microwave susceptor comprises a plurality of rows of horizontally aligned susceptor rods spaced apart a different heights in the tube, said step of introducing a spent petrochemical refining catalyst further comprising introducing the catalyst into the top of said tube and allowing the catalyst to fall to the bottom of said tube while irradiating said tube with microwave energy.

* * * * *